Feb. 4, 1930.     L. D. PICKETT     1,745,810
LIGHT RAY CONTROL APPARATUS
Filed March 30, 1925
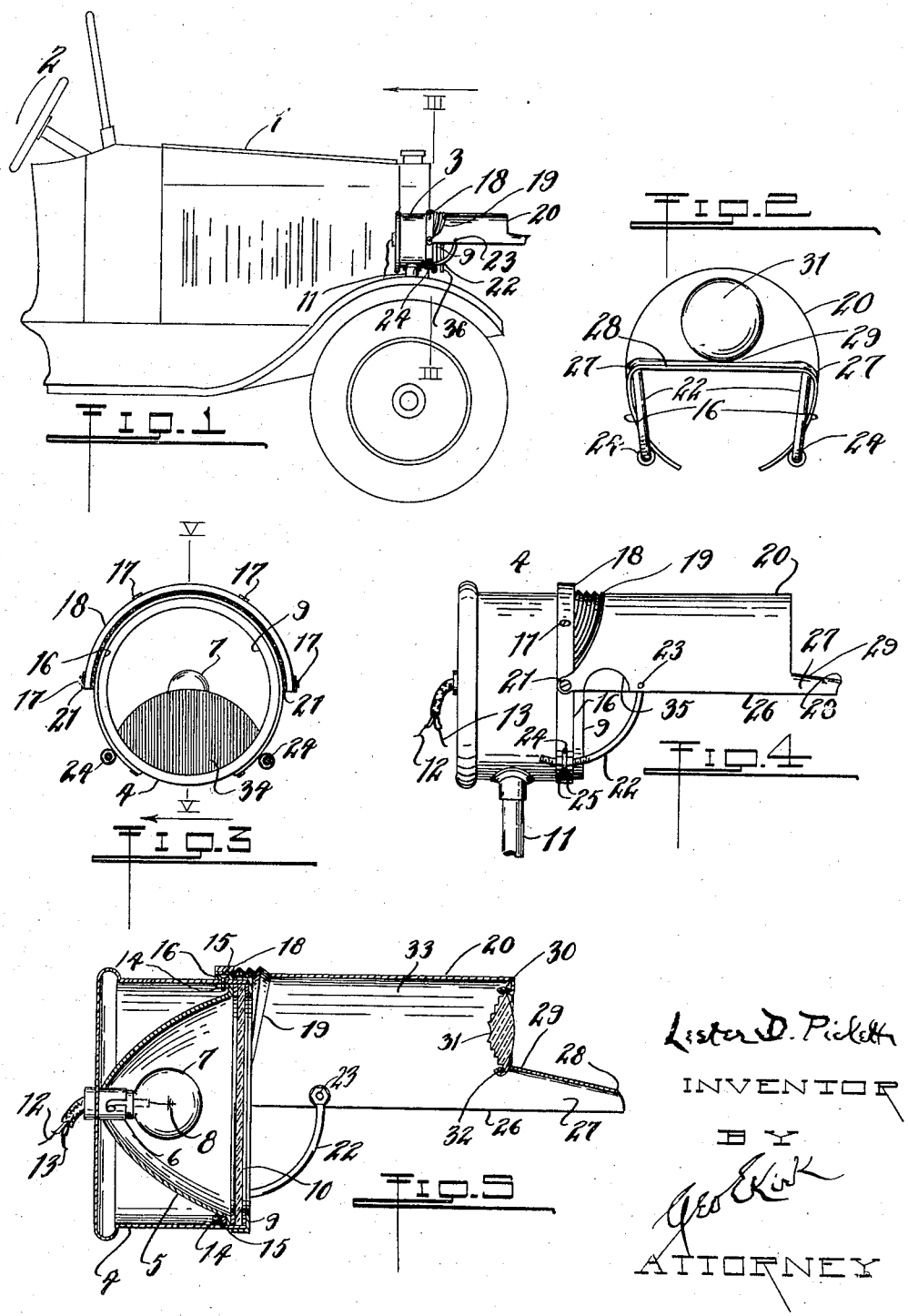
Lester D. Pickett
INVENTOR
BY
Geo E Kirk
ATTORNEY Patented Feb. 4, 1930

1,745,810

UNITED STATES PATENT OFFICE

LESTER D. PICKETT, OF DUNKIRK, NEW YORK

LIGHT-RAY-CONTROL APPARATUS

Application filed March 30, 1925. Serial No. 19,439.

This invention relates to illumination.

This invention has utility more particularly as an attachment for projectors, as headlights, for motor vehicles, in providing effective illumination for a highway an adequate driving distance ahead even of intensity to readably disclose a license number as approaching or receding one hundred fifty feet from the car with such rays in the region below or so low that such may not be directed into the face of a pedestrian or approaching driver. Additionally, there is adequate signal to such pedestrian or approaching driver due to light signal from a common source through this control or hood which projection is preferably in the form of a colored ray, as green, or green and red.

Referring to the drawings:

Fig. 1 is a fragmentary view of a motor vehicle embodying features of the invention as adapted thereto in the form of an attachment to the regular headlights for such vehicle;

Fig. 2 is a front view of the headlight hood in demounted position;

Fig. 3 is a partial section on the line III—III, Fig. 1;

Fig. 4 is a side elevation of the hood or attachment mounted with one of the lights of Fig. 1; and Fig. 5 is a section on the line V—V, Fig. 3.

Motor vehicle 1 is shown as having driver's station 2, and headlights 3, 4. These headlights are provided with housing having therein parabolic reflector or projector 5. In the central portion of such projector 5 is socket 6 for incandescent electric bulb 7 having filament 8. These lamps 3, 4, are shown of the drum type having forward rim 9 holding in position lens 10. Mountings 11 position the headlights as to the frame of the vehicle 1 and leads 12, 13, supply electric current for controlling the illumination of the filament 8 in the bulb 7.

On the inner side of the housing just back of the forward rim 9, threaded portions, as nuts 14, may be soldered into position or otherwise anchored, to permit flat head screws 15 entering flush with U-shaped band 16 to coact in fixedly mounting such band as a foundation on this headlight housing. With such as a foundation, bolts 17 serve to clamp supplemental U-portion 18 upon this base U-portion 16 to clamp flexible portion, as leather, for joint hinge 19 of forward projecting hood portion 20 having eyes 21 engaged by the lower pair of bolts 17 as mounting the clamp U-member 18. There is thus a pivotal connection for this forwardly extending hood member 20.

This hood member 20 is maintained in adjusted position by brackets 22 having fixed connection 23 with the hood and extending through eyes 24 and secured by nuts 25 on each side of said eyes 24. This hood 20 is, accordingly, adjustable on its pivot mountings 21 as permitted by the flexible portion 19. This leather portion 19 serves as a weather shedding hinge. Adjustment of the angle of this hood 20 may be effected with delicacy and maintained rigidly against vibration.

The hood 20, as projecting forwardly from the headlight, is provided with lower side portions 26 extending from drop portions 27 as cheeks for forward lip 28. From this portion 28 is a slight rise 29 for a short distance rearwardly to seat 30 in which is mounted lens 31 retained by split-ring 32. The interior 33 of this hood 20 is of light reflecting finish.

In practice, it is desirable that this hood control or lamp ray projection from the bulb in the headlight be so that direct clear rays may not glare to blind or confuse an approaching pedestrian or driver. The adjustment as permitted by the brackets 22 permits an accurate control for the maximum height line for intense ray projection. The reflector 5 in combination with the lens 10 and reflector interior 33 of the hood 20 are factors in efficient distribution and projection of the rays in the limited field. No direct rays from the bulb are sent out to confuse traffic. The bull's eye lens 31, which may be, say green, red, yellow, or a selected color, is an efficient signal of the approaching vehicle and its location.

The lower edge 26 of the hood 20 may on the inner side thereof as approaching the hinge mounting portion 21, have cutout portion 35 so that the light dispersing interior 33 of the hood 20 may be effective in lighting up license plate 36 as carried by the vehicle 1.

What is claimed and it is desired to secure by United States Letters Patent is:—

1. A headlight housing, a light bulb therein, and lenses for rays from said bulb eclipsed by one lens as to the field of the other, there being a relatively adjustable, forwardly extending hood for mounting one of said lenses approximately parallel to the other and in laterally offset position from a line forward centrally of the other lens and the bulb.

2. A demountable adjustable semi-cylindrical hood for a headlight complete in itself comprising a detachable pivotal mounting, a locking clamp therefor, and a distensible folded continuous upper section from the mounting.

3. A demountable adjustable semi-cylindrical hood for a headlight comprising a detachable pivotal mounting, a locking clamp therefor, a distensible folded continuous upper portion, and adjusting brackets effective for shifting the hood as to said upper portion.

4. A headlight comprising a housing having a forward opening, a lens in the opening, a light bulb in the housing for directing light rays through the lens, and a semi-cylindrical hood extending forwardly from said lens and having its axis approximate the line from the bulb through the central portion of the lens for projecting forwardly of the housing, said hood forwardly terminating in a drop portion including an additional lens approximately parallel to the other lens.

5. A headlight housing, a light bulb therein, a first lens in the housing, an open bottom adjustable hood extending forwardly from the housing, a second lens in the forward portion of the hood laterally offset from a line forward centrally of the housing carried lens and bulb and approximately parallel to the other lens.

In witness whereof I affix my signature.

LESTER D. PICKETT.